United States Patent
Brooks et al.

(10) Patent No.: US 7,529,868 B2
(45) Date of Patent: May 5, 2009

(54) METHOD AND APPARATUS FOR CONTROLLING A PERIPHERAL VIA DIFFERENT DATA PORTS

(75) Inventors: Donald E. Brooks, Ithaca, NY (US); Richard S. Quaif, Dryden, NY (US)

(73) Assignee: TransAct Technologies Incorporated, Hamden, CT (US)

(*) Notice: Subject to any disclaimer, the term of this patent is extended or adjusted under 35 U.S.C. 154(b) by 14 days.

(21) Appl. No.: 11/365,751

(22) Filed: Feb. 28, 2006

(65) Prior Publication Data

US 2006/0221386 A1  Oct. 5, 2006

Related U.S. Application Data

(63) Continuation-in-part of application No. 11/102,458, filed on Apr. 7, 2005, now Pat. No. 7,099,035, which is a continuation-in-part of application No. 10/325,214, filed on Dec. 20, 2002, now Pat. No. 6,924,903.

(51) Int. Cl.
  *G06F 13/12* (2006.01)
(52) U.S. Cl. .............................. 710/62; 710/64; 358/1.1
(58) Field of Classification Search ........................ None
  See application file for complete search history.

(56) References Cited

U.S. PATENT DOCUMENTS

| | | | |
|---|---|---|---|
| 4,157,829 A | 6/1979 | Goldman et al. | |
| 5,075,874 A | 12/1991 | Steeves et al. | |
| 5,256,863 A | 10/1993 | Ferguson et al. | |
| 5,687,396 A | 11/1997 | Satoh et al. | |
| 5,791,790 A | 8/1998 | Bender et al. | |
| 5,982,997 A | 11/1999 | Stone et al. | |
| 6,260,084 B1* | 7/2001 | Wilson et al. | 710/38 |
| 6,327,044 B1 | 12/2001 | Shima | |

(Continued)

FOREIGN PATENT DOCUMENTS

EP  1 035 527  9/2000

(Continued)

OTHER PUBLICATIONS

U.S. Appl. No. 60/369,097, filed Mar. 29, 2002, Meyerhofer.

(Continued)

*Primary Examiner*—Eron J Sorrell
(74) *Attorney, Agent, or Firm*—Lipsitz & McAllister, LLC

(57) ABSTRACT

A peripheral such as a printer is controlled to receive data from different data ports. A first port receives data formatted according to a first protocol. A second port receives data formatted according to a second protocol. A first processor is associated with the peripheral. A second processor is associated with the second port. A switch is adapted to receive (i) first data from the first port and (ii) second data from the second port after processing by the second processor. The switch is controlled in response to a command received via the second port to couple either the first data or second data to the first processor for use in controlling the peripheral. New firmware can be downloaded to the peripheral via the second port in response to the command. The command can be communicated to the first processor via a separate port at the first processor and a memory shared with the second processor.

10 Claims, 8 Drawing Sheets

U.S. PATENT DOCUMENTS

| | | |
|---|---|---|
| 6,415,341 B1 | 7/2002 | Fry, Sr. et al. |
| 6,442,449 B1 | 8/2002 | Blasy et al. |
| 6,493,110 B1 | 12/2002 | Roberts |
| 6,575,090 B1 | 6/2003 | Vienneau et al. |
| 6,647,437 B2 | 11/2003 | Ackerman et al. |
| 6,676,515 B1 | 1/2004 | Baltz et al. |
| 6,679,775 B1 | 1/2004 | Luciano et al. |
| 7,008,320 B2 | 3/2006 | Rowe et al. |
| 2002/0060808 A1 | 5/2002 | Henderson et al. |
| 2002/0151348 A1 | 10/2002 | Burns et al. |
| 2003/0013527 A1 | 1/2003 | Rowe et al. |
| 2004/0053681 A1 | 3/2004 | Jordan et al. |
| 2004/0095604 A1 | 5/2004 | Meyerhofer |
| 2004/0132529 A1* | 7/2004 | Mkrtchyan et al. ............ 463/29 |
| 2005/0038704 A1 | 2/2005 | Meyerhofer |
| 2005/0182822 A1* | 8/2005 | Daniel et al. ................ 709/213 |
| 2006/0017958 A1 | 1/2006 | Jackson et al. |
| 2006/0039733 A1 | 2/2006 | Meyerhofer |
| 2006/0151118 A1 | 7/2006 | Murata et al. |

FOREIGN PATENT DOCUMENTS

| | | |
|---|---|---|
| EP | 1 209 640 | 5/2002 |

OTHER PUBLICATIONS

U.S. Appl. No. 60/394,568, filed Jul. 9, 2002, Mkrtchyan et al.
U.S. Appl. No. 60/396,862, filed Jul. 18, 2002, Mkrtchyan et al.
U.S. Appl. No. 60/378,491, filed May 7, 2002, Meyerhofer.

* cited by examiner

METHOD AND APPARATUS FOR CONTROLLING A PERIPHERAL VIA DIFFERENT DATA PORTS

This application is a continuation-in-part of commonly owned, co-pending U.S. patent application Ser. No. 11/102,458 filed on Apr. 7, 2005, which was a continuation-in-part of commonly owned, U.S. patent application Ser. No. 10/325,214 filed on Dec. 20, 2002, now U.S. Pat. No. 6,924,903.

BACKGROUND OF THE INVENTION

The present invention relates generally to printers, and more particularly to methods for driving a printer in a user terminal. Such printers are particularly well suited for use in gaming machines, vending machines, point-of-sale (POS) terminals, transportation and entertainment ticket machines, and the like.

Ticket printers are useful in a variety of applications. One such application is to print coded tickets or vouchers used in lottery terminals, slot machines and other self-service wagering or transaction (e.g., train, event or airline ticket) apparatus. For purposes of the present disclosure and appended claims, the term "voucher" will be used to mean a printed document, such as a ticket, that has (or potentially has) a meaningful cash value and must be printed using secure technology to prevent counterfeiting. The term "coupon" is used to refer to documents that have at most only a negligible cash value, and which can be printed without the high level of security required for vouchers. It should be appreciated that coupons may be printed using secure technology; however, the level of security will typically be lower than that used in connection with vouchers.

Various printer systems have been proposed for use in self-service terminals, such as for cashless gaming systems used, e.g., at casinos and racetracks. In such systems, a voucher is printed for use by a gaming patron instead of, e.g., tokens, cash, debit cards and credit cards. Such self-service terminals may be controlled, or at least partially controlled, by a Central System Controller (CSC) via a network. The CSC may be situated at the same location as the terminals, or may be remotely located. A remotely located CSC may service different terminal populations at a plurality of facilities (such as different casinos, racetracks, retail lottery establishments, etc.).

A facility that uses the terminals may desire to have the capability for the terminal printers to print items other than the voucher. For example, it may be desired to print coupons for use at the facility. Such coupons may, for example, provide free or discounted food items at the facility. Other types of coupons are also envisioned in order to fulfill e.g., various marketing, advertising, and promotional purposes, such as discounts to future special events, advertising of new products and services, free or discounted parking, hotel room upgrades, travel and entertainment promotions, contest entries, and the like.

In most of the terminals already in the field, there is no way for the facility management to access the printer portion of the terminal to print special coupons that are separate from (and may be unrelated to) the vouchers. In order to provide such a capability, vendors have offered new models of terminals that can print coupons. These new terminals require the use of proprietary software, hardware and/or protocols to enable the terminal printer to print vouchers and coupons. The printing of coupons, when offered, is handled via the secure processing channels used for the vouchers, which vouchers are subject to stricter access control and security requirements. This solution is unacceptable to many facilities because it requires the purchase of new terminals. For a facility that has hundreds of such terminals, such a solution is cost prohibitive.

In the counterpart disclosures from which priority of the present patent application is claimed, a more cost effective way is provided for facilities to print coupons from their terminals. The disclosed system overcomes any need to replace an existing population of terminals. A controller (e.g., a secure controller) that is internal to the terminal (e.g., wagering terminal, POS terminal, or other consumer terminal) is enabled to communicate with the terminal printer to print vouchers, while also allowing a CSC, which is external to the terminal, to communicate with the built-in terminal printer to print coupons and other documents.

The present invention provides additional functionality to a peripheral, such as a printer. In particular, the present invention enables downloads, such as updated printer or terminal firmware, to be provided from the CSC or a local computer (e.g., a technician's notebook computer) via a separate port at the peripheral. For example, where the peripheral is a printer, a USB port can be provided in accordance with the invention to accommodate such downloads. A technician can then plug a portable device (e.g., notebook, PDA, tablet computer, flash memory or the like) into the USB port and provide the new software or firmware to the printer.

There are occasions when a printer will have two or more separate ports to accommodate data communication protocols such as RS-232, Netplex, USB or $I^2C$. Each of these protocols is well known in the art, as described in greater detail below. Where it is desired, for example, to provide data to a printer via a Netplex port, and allow new firmware or other data to be downloaded to the printer via a USB port, a mechanism must be provided to switch between the two ports.

Some protocols, such as USB, require specialized and/or dedicated cables to be used to reliably communicate signals. The necessary cables to accommodate USB signals may not be provided in existing peripherals, such as printers for a wagering terminal (e.g., slot machine), ticket machine, POS terminal or the like. Since it is desirable to use existing printers rather than replace a population of installed printers with new models, it would be advantageous to provide a means to do so even when the existing printers do not have the necessary cables to support a new protocol, such as USB. For example, existing printers may be configured to receive Netplex, RS-232 and $I^2C$ signals, but not USB signals. It would be advantageous to allow such printers to also receive USB signals, particularly for the purpose of downloading new firmware over a USB port. It would be further advantageous to provide a way for a signal coming from the USB port to switch the printer to a USB receiving mode, if the printer was previously in another mode of operation, such as Netplex.

The present invention provides methods, apparatus and systems with these and other advantages.

SUMMARY OF THE INVENTION

In accordance with the present invention, methods and apparatus are provided for driving a peripheral. Peripheral commands are received in a first protocol at a first port. Peripheral firmware is received in a second protocol at a second port. Data are to the peripheral from the first port or from the second port in response to a command received at the second port. The peripheral can comprise, for example, a printer, such as a gaming machine or point of sale printer.

In an illustrated embodiment, the first port receives data in one of an RS-232 or Netplex protocol, and the second port receives data in a USB protocol. A first processor associated with said printer has a serial data input. A second processor associated with the second port has a USB data input for receiving USB data from the second port. USB data received at the second processor is converted into serial RS-232 formatted data.

The step of directing data can comprise coupling either (i) data from the first port or (ii) serial RS-232 formatted data converted from USB data received at the second port, to the serial data input of the first processor in response to the command. The command is derived from USB data received by said second processor.

The first processor may also have an I²C data port. In such an embodiment, a shared memory can be provided for the first and second processors, and the command can be stored in the shared memory. The command from the shared memory can be communicated to the first processor via the I²C data port. The first processor is configurable to accept data in the protocol received at said first port, or to accept data in the serial RS-232 format provided by said second processor, depending on said command.

Apparatus is disclosed for controlling a peripheral to receive data from different data ports. The apparatus can comprise a first port for receiving data formatted according to a first protocol, and a second port for receiving data formatted according to a second protocol. First and second processors are provided. The first processor is associated with the peripheral. The second processor is associated with the second port. A switch (e.g., a multiplexer) is adapted to receive (i) first data from the first port, and (ii) second data from the second port after processing by the second processor. The switch is controlled in response to a command received via the second port to couple either the first data or second data to said first processor for use in controlling the peripheral.

The peripheral can comprise, for example, a printer such as a gaming machine printer or a printer for a point of sale terminal.

In an illustrated embodiment, the first port receives data in one of an RS-232 or Netplex protocol, and the second port receives data in a USB protocol. The second processor provides the second data by converting the USB protocol data from the second port into serial RS-232 formatted data. The first processor has a serial data input, and the switch couples the first or second data to said serial data input.

The first processor can also have an I²C data port. A shared memory can be provided for the first and second processors for storing the command. The command can be communicated from the shared memory to the first processor via the I²C data port.

DETAILED DESCRIPTION OF THE INVENTION

The present invention relates to the control of a computer peripheral, such as a gaming machine printer or POS terminal printer. More particularly, the invention relates to an interface for enabling printers or other peripherals to receive commands in a first protocol, such as Netplex or RS-232, and firmware or other data in a second protocol, such as USB. The peripheral (e.g., printer) can reside in a customer operated terminal such as a gaming machine (e.g., slot machine or lottery terminal), vending machine, self-service ticket terminal, POS terminal, or the like. In a gaming machine implementation, a local controller can be provided that comprises the portion of the gaming machine sometimes referred to as the "game controller." In such an implementation, a system controller can be provided which comprises the central system controller that is sometimes referred to as the "game management unit." Typically, the local controller is part of the terminal that provides the customer with vouchers and coupons, and the central system controller is a remote device that is either in the same facility where the terminals are located, or in a different facility that can be located virtually anywhere.

Various well known standards are mentioned herein for use in communicating signals between different elements of the disclosed embodiments. These include the RS-232, USB, Netplex and I²C standards. RS-232 is a well known standard that provides an interface between data terminal equipment and data communications equipment, in which serial binary data interchange is used. Netplex, a standard developed by International Game Technology of Reno, Nev., USA, provides a multidrop serial communication link between a central system and peripheral devices, and is used to transfer information and allow control of peripherals. Universal Serial Bus (USB) is a connectivity specification developed by the USB Implementers Forum. USB is used to connect peripherals outside a computer in order to eliminate the inconvenience of opening the computer case for installing cards needed for certain devices. I²C, or 2-wire communication, is a form of synchronous serial communication that was developed by Phillips Semiconductor.

Figure 1:
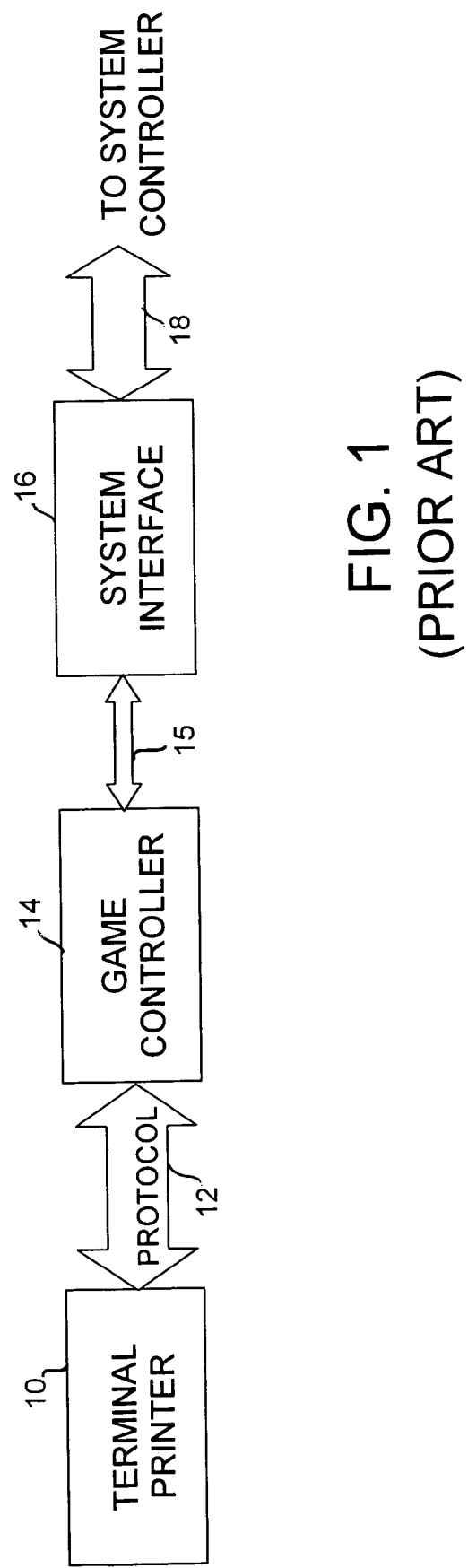
FIG. 1 is a block diagram of a prior art architecture for controlling the printer in a slot machine.

The interface disclosed herein overcomes the drawbacks of prior art systems that require a proprietary terminal to be purchased to provide both vouchers and coupons. Such a prior art system is shown in FIG. 1, where a terminal printer 10 is provided for printing vouchers and coupons in response to commands from a game controller 14. The game controller 14 provides print commands to printer 10 using a protocol 12 that is compatible with the printer. For example, protocol 12 may comprise one or the other of the RS-232 or Netplex protocols well known in the art of data transmission.

In the prior art embodiment of FIG. 1, the game controller 14 is a proprietary device that is included in the gaming machine. The game controller controls the basic gaming machine hardware, including the printer, coin dispenser, bill acceptor, reels (for a slot machine), etc. and also generates ticket data using a serial number obtained from a central system controller via a system interface 16. The system interface communicates with the central system controller and with the game controller. It obtains the ticket serial numbers from the central system controller and provides these numbers to the game controller. The system interface is also responsible for player tracking, and controls the gaming machine card reader and display.

Each particular manufacturer of such gaming machines will generally have its own game controller technology which is kept secret for security and competitive reasons. Due to the proprietary nature of the game controller which drives the printer, it is not possible for the customer to access the printer directly for the printing of other documents, such as coupons. And, where coupon printing is offered in present day gaming machines, it is only provided via the proprietary game controller, which means the coupons must be generated in association with the gaming machine manufacturer. In particular, where a customer desires a coupon to be printed, the manufacturer of the gaming machine must provide the technology to do so via the game controller 14. This enables the manufacturer to charge additional fees to upgrade current gaming machines, or to require the purchase of new gaming machines with coupon printing capabilities.

At least one gaming machine manufacturer has provided a new model terminal that allows coupon information input at the central system controller to be communicated to the gaming machine system interface 16 via communication path 18. The communication path 18 can comprise, for example, a private network (wired and/or wireless) or the Internet. The system interface 16 will pass the coupon information via path 15 to the proprietary game controller 14, which converts the information as necessary to generate coupon print commands that are provided to the terminal printer 10. Since only the game controller 14 communicates with the printer, there is no way to avoid the use of the proprietary game controller technology to effect the printing of coupons. Thus, the facilities (e.g., casinos) that own the gaming machines are completely dependent on the gaming machine manufacturers to provide the ability to print coupons in addition to the vouchers that the gaming machines are already designed to print.

Figure 2:
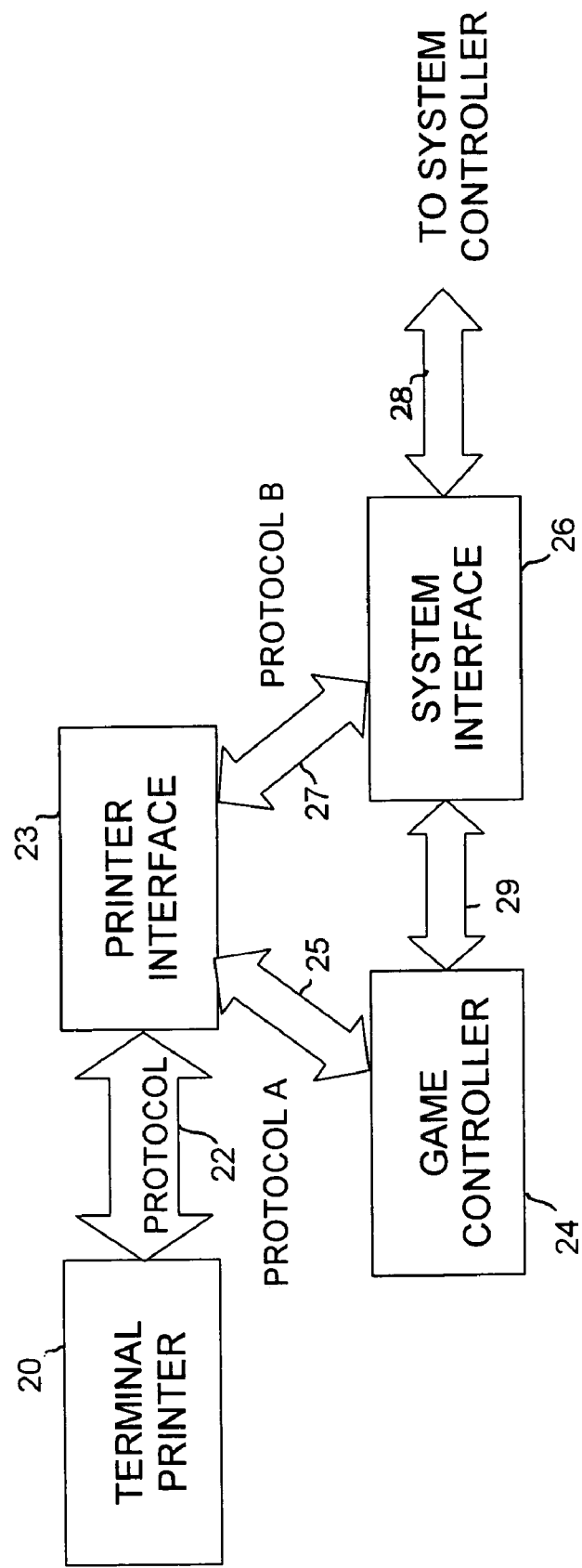
FIG. 2 is a block diagram of a system architecture.

FIG. 2 illustrates an embodiment according to the present invention, wherein coupons can be printed without reliance on the gaming machine manufacturer. In the embodiment of FIG. 2, a printer interface 23 is provided between the system interface 26, game controller 24 and the printer 20. Information from the central system controller (which may optionally include information defining a particular coupon to be printed) is provided to the system interface 26 via communication path 28 (similar to communication path 18). The system interface passes the data received from the central system controller to the game controller 24 in a conventional manner, via path 29 (like path 15 in FIG. 1). The conventional data provided as output from the game controller 24 is communicated to the printer interface 23 via path 25 with the normal protocol used by the game controller, e.g., RS-232 or Netplex ("Protocol A"). The information received from the central system controller is also passed from the system interface 26 directly to the printer interface 23 via path 27, according to a suitable protocol such as I²C ("Protocol B"). It should be understood that any of various different protocols can be used to send the printer information from the system interface 26 to the printer interface 23. In fact, one of the advantages of the present invention is that the communication between the system interface and the printer interface is not a proprietary communication, as is the communication between the game controller and the printer interface. Thus, while Protocol A will be defined by the game machine manufacturer, Protocol B is not so defined. Protocol B can be any protocol that the system interface is capable of communicating with. By providing a generic printer interface 23, the present invention allows coupon information from the central system controller to be printed without passing through and being subject to the processing requirements of the game controller 24.

Once the printer interface 23 receives data from either game controller 24 (e.g., voucher information) or system interface 26 (e.g., coupon information), it determines whether the printer 20 is available, and if so, processes the received data for communication to the printer in a proper format. The properly formatted data is then sent to the printer via path 22, using the protocol (e.g., RS-232) that the printer is designed to receive. The operation of the printer interface is explained in greater detail hereinafter in connection with FIG. 5.

Figure 3:
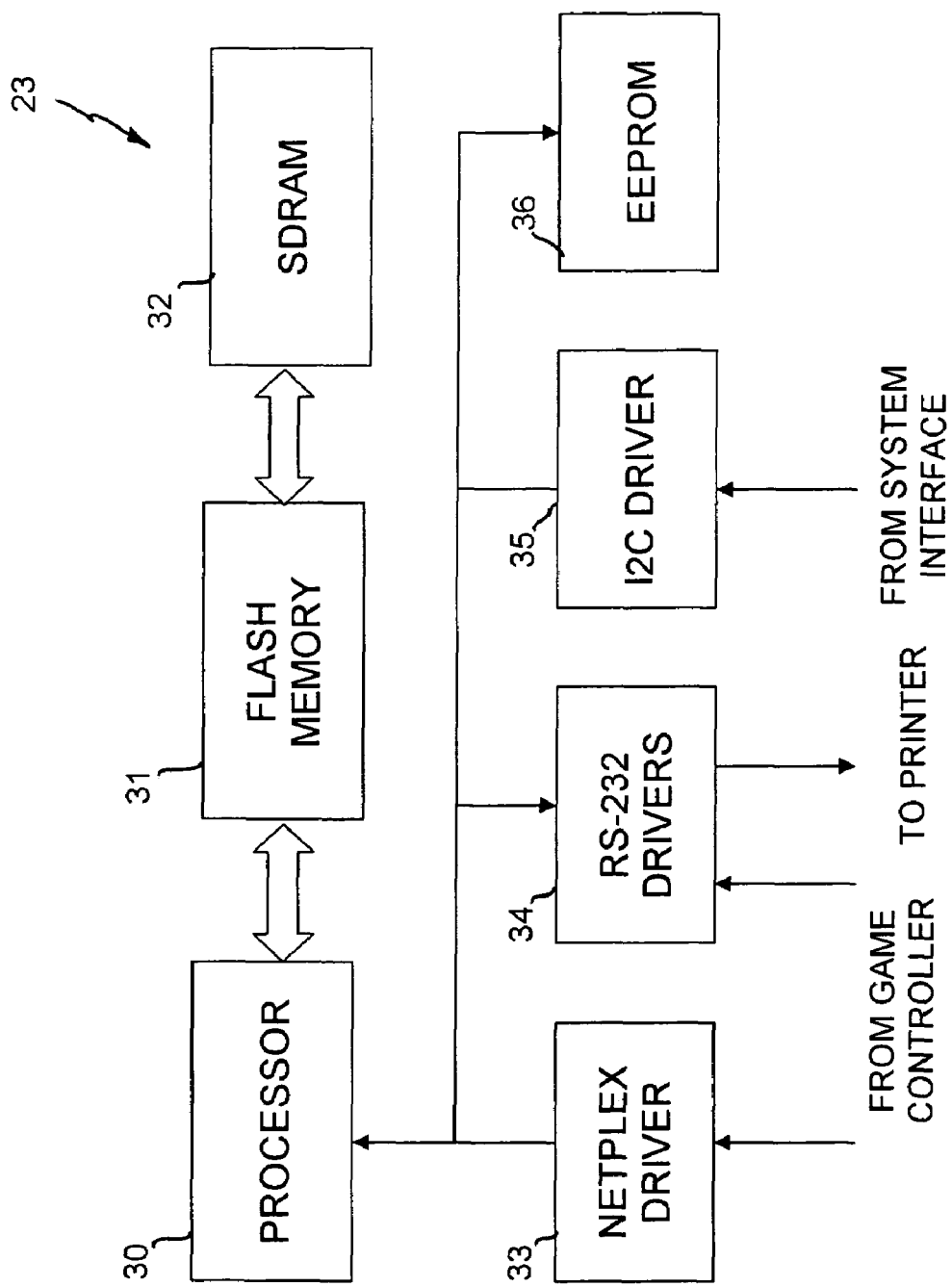
FIG. 3 is a block diagram of an example interface implementation.

FIG. 3 is a block diagram illustrating the hardware and software/firmware components of the printer interface 23. A processor 30 processes data received from the game controller 24 and the system interface 26 via respective drivers 33, 34 and/or 35. Driver 33 is, for example, a Netplex driver configured to receive data formatted using the Netplex protocol from the game controller. Such data may comprise, for example, data necessary to print a voucher. Alternatively, the game controller may be configured to provide voucher data using the RS-232 protocol, in which case data will be received by and passed to the processor 30 using RS-232 drivers 34. Coupon data is provided to the processor 30 from the central system controller via the system interface using, e.g., an I²C protocol. The I²C driver 35 processes the coupon data from the system interface and passes it on to the processor 30.

Software and/or firmware that instructs the processor 30 how to decode and convert the data received from the game controller and system interface to the format required by the printer is stored in one or more of EEPROM 36 and flash memory 31. SDRAM 32 is provided for storage of interim values computed by processor 30 as well as other temporary information as well known in the art. Once the voucher or coupon information is decoded and converted to the proper format for printing, it is communicated to the printer via RS-232 drivers 34. Prior to being communicated to the printer, the print data can be temporarily stored in SDRAM 32.

Figure 4:
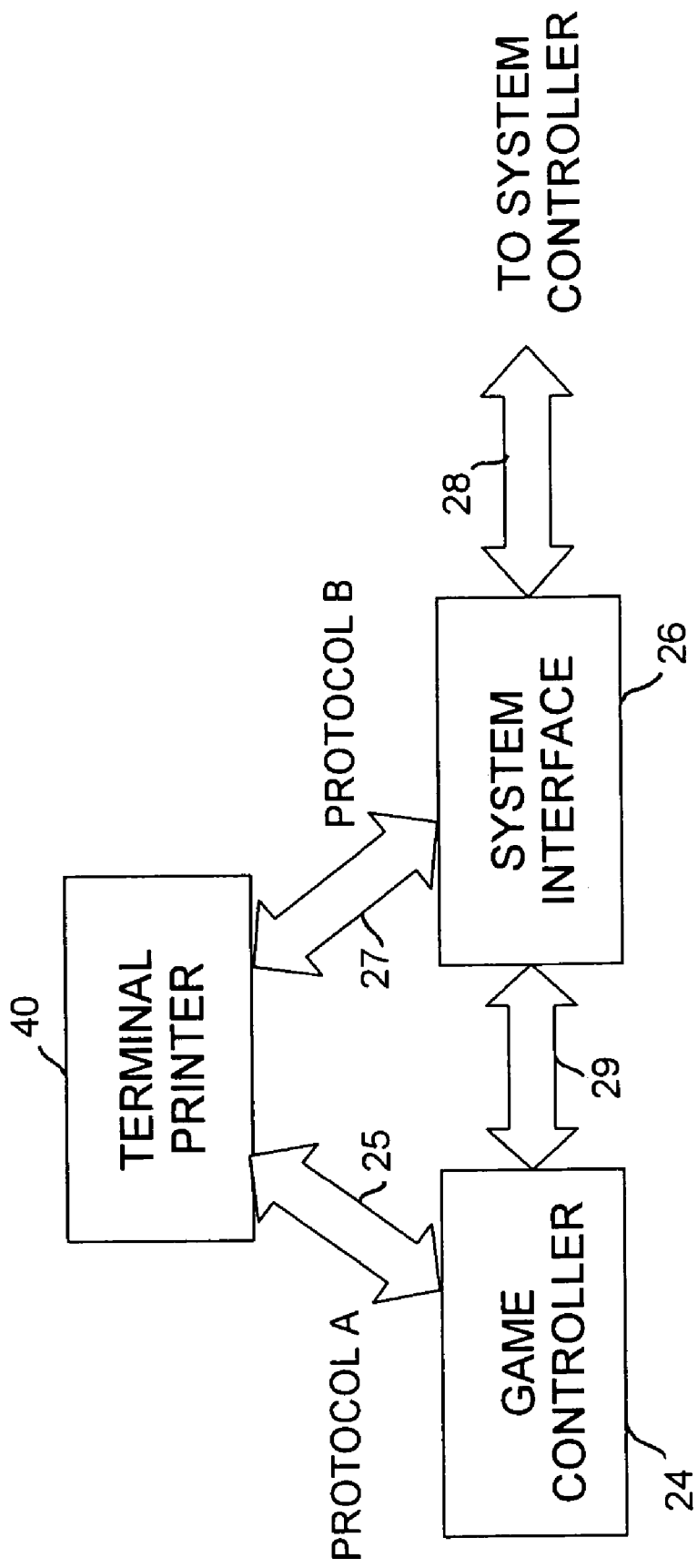
FIG. 4 is a block diagram of an another system architecture embodiment.

FIG. 4 is a block diagram of an alternate embodiment where the printer interface 23 is incorporated within the terminal printer. In particular, all of the elements illustrated in FIG. 3 can be built into terminal printer 40. Such an embodiment is an economical alternative to providing a separate printer interface as shown in FIG. 2, since the printer controller already present in the printer can provide many (if not all) of the functionality provided by printer interface processor 30. Memory already present in the printer can also be shared to accommodate the needs of the printer interface. Such an implementation eliminates the need for two separate processors and additional memory.

As shown in FIG. 4, all communications between the game controller and system interface discussed in connection with FIG. 2 are now passed directly to the terminal printer 40. The functions of printer interface 23 and communication path 22 will be performed by equivalent elements that are integrated with the printer 40 itself.

Figure 5:
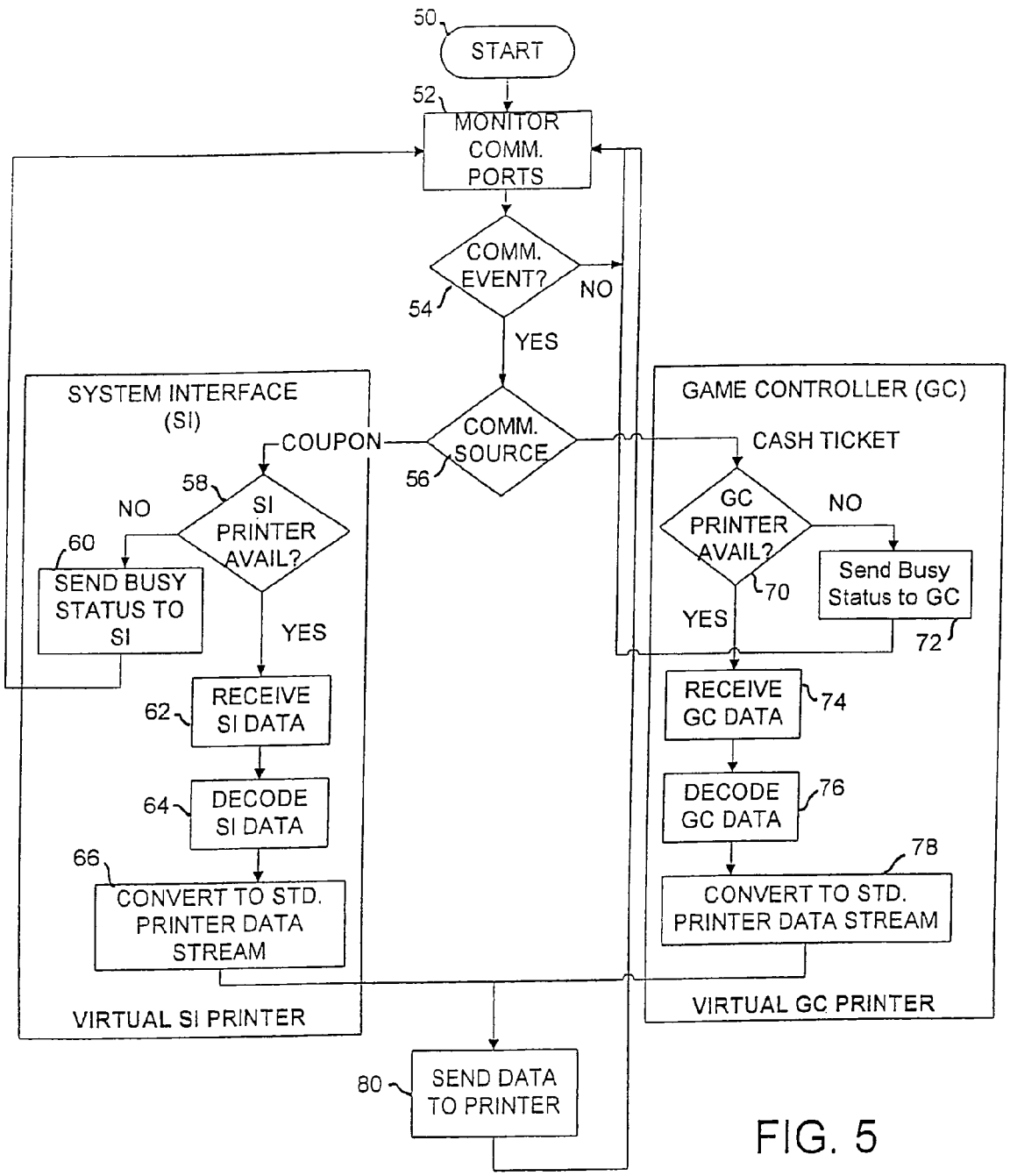
FIG. 5 is a flowchart illustrating an example communication flow that can be implemented.

FIG. 5 is a flowchart illustrating the communication flow for the printer interface. It is noted that the communication flow illustrated is an example of one possible implementation of the printer interface, and that other implementations are possible and within the intended scope of the invention.

The routine of FIG. 5 starts at box 50. At box 52, the communication ports from the game controller and system interface are monitored for a communication event. For example, in the embodiment shown in FIG. 2, the printer interface 23 monitors communications from the game controller 24 via path 25. Similarly, communications from the system interface 26 are monitored via path 27. If a communication event (e.g., a message for the printer) is detected at box 54, the communication source (game controller or system interface) will be determined at box 56.

Upon determining that a printer message has arrived from the system interface, the message is directed from box 56 to box 58, where a determination is made as to whether the printer is available to print a coupon received from the central system controller. If not, a busy status signal is sent to the system interface so that it can send the message again later (box 60). The routine then continues to monitor the communication ports as indicated at box 52.

If it is determined at box 58 that the printer is available to print a coupon, the coupon data from the system interface is received (box 62), decoded (box 64), and converted to a standard printer data stream (box 66). The standard printer data stream is formatted for the particular printer that is going to print the coupon (e.g., terminal printer 20 of FIG. 2 or terminal printer 40 of FIG. 4). Although different printers can be provided to print coupons and vouchers, the preferred embodiment is to use the same printer for both. After the coupon information is converted to the standard printer data stream as indicated at box 66, it is forwarded to the printer for printing of the coupon (box 80). The routine then returns to box 52, where the communication ports continue to be monitored.

In the event that a communication event is detected from the game controller, this fact is determined at boxes 54 and 56, and at box 70 a determination is made as to whether the printer is available to print a voucher. If not, a busy status is sent to the game controller (box 72) and the routine returns to box 52 for continued monitoring of the communication ports. If the printer is determined to be available at box 70, the game controller data is received at box 74, decoded at box 76, and converted to a standard printer data stream at box 78. The standard printer data stream, formatted for the printer, is passed on to the printer for printing of the voucher, as indicated at box 80. The routine then loops back to box 52 for continued monitoring of the communication ports.

The standard printer data stream will be formatted according to the protocol needed by the particular printer used. For example (and as shown in FIG. 3), the printer data stream may be in the RS-232 format. Those skilled in the art will appreciate that other formats can be used, such as $I^2C$, Netplex, or USB. New printer formats can be accommodated as they are developed, by providing the appropriate driver in the printer interface.

Figure 6:
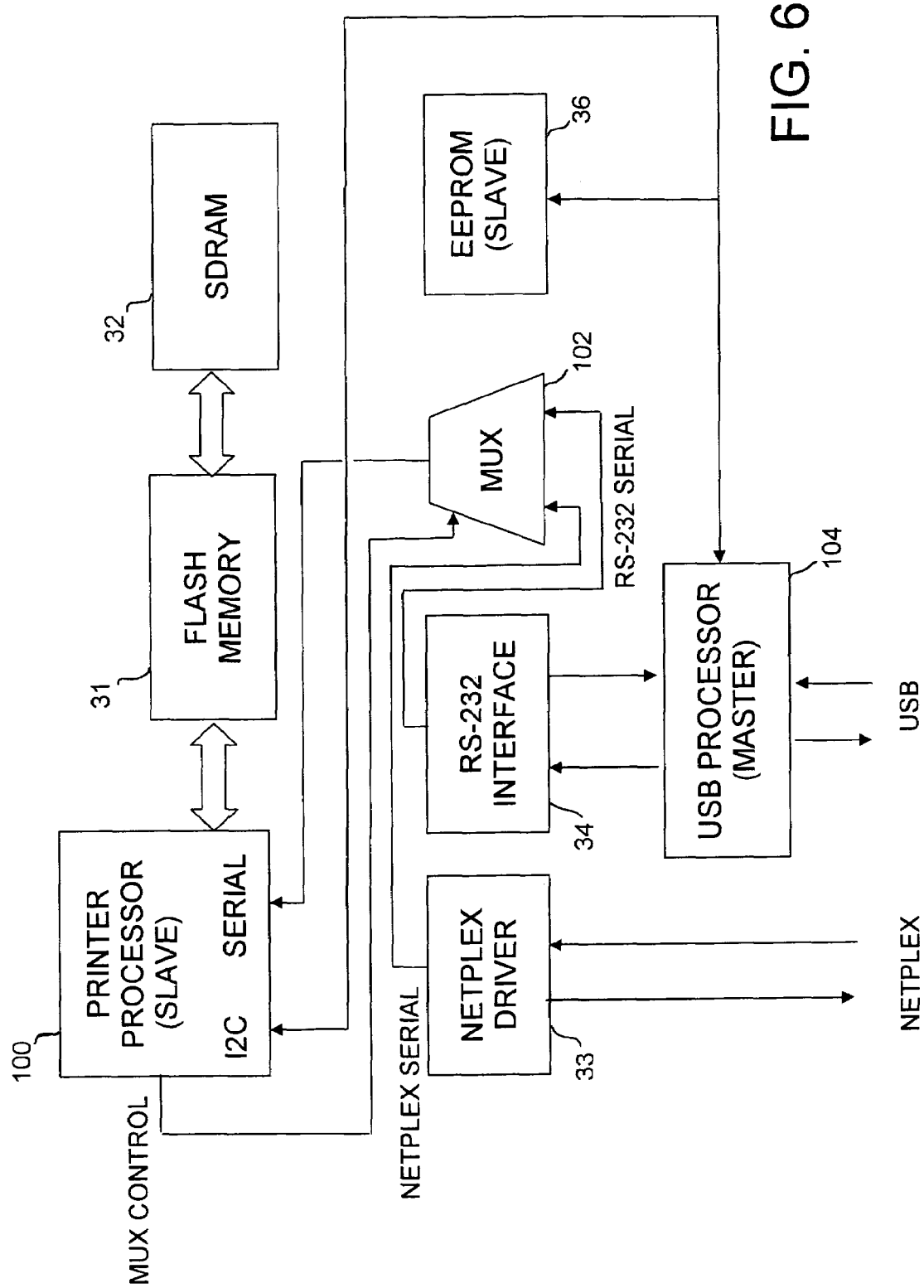
FIG. 6 is a hardware block diagram of an example implementation in accordance with the present invention.

FIG. 6 is a hardware block diagram of a system in accordance with the present invention, in which data received in either a Netplex format or a USB format can be selectively provided to a printer processor 100 via a multiplexer (MUX) 102. The printer processor 100 is used to control a printer to carry out its printing functions. It is also used in connection with the present invention to facilitate the downloading of new firmware into printer flash memory 31. Processor 100 has both an $I^2C$ port and a serial port. The serial port can, for example, comply with the RS-232 serial communication protocol. SDRAM 32 is provided for storage of interim values computed by processor 100 as well as other temporary information as well known in the art.

Netplex data is received by the Netplex driver 33, and output as Netplex serial data to one input port of MUX 102. The other input port of MUX 102 receives RS-232 serial data from RS-232 interface 34. This RS-232 data can actually be data that is received as USB data, and be intended for downloading into flash memory 31 of the printer. After the USB data to be downloaded is received at USB processor 104, the USB processor converts it to RS-232 data so that it can be carried over a conventional serial data path (e.g., ribbon cable) to the serial port of printer processor 100. Conversion of the USB data is straightforward, and consists of stripping the substantive data packets from the overhead and other information carried in the USB data stream. Then, the data packets are repackaged in accordance with the RS-232 protocol, as well known in the art.

In one scenario, a technician will arrive at a gaming terminal or the like with a portable device, such as a notebook computer. The technician will connect the USB output from his portable device to a USB port coupled to the USB Processor 104. The USB data stream, which may contain updated firmware for the printer, will be received by the USB processor 104 and the data packets will be repackaged into RS-232 format. A portion of the USB data will comprise a command that is recognized by the USB Processor as a command intended to switch the MUX 102 to deliver the RS-232 data from RS-232 interface 34 to the serial port of printer processor 100. This command is sent by the USB processor to the $I^2C$ port of the printer processor 100 via memory 36 (e.g., EEPROM). Memory 36 is shared between the USB processor 104 and the printer processor. In response to the command, printer processor 100 will generate a MUX control signal which is provided to a switching input of MUX 102. If MUX 102 is currently providing the Netplex serial data from Netplex driver 33 to the serial port of printer processor 100, the MUX control signal will cause the MUX to instead commence output of the RS-232 serial data from RS-232 interface 34, thereby providing the RS-232 serial data to the serial port of printer processor 100. As will be appreciated by those skilled in the art, in the illustrated embodiment, USB processor 104 acts as a master processor, and shared memory 36 as well as printer processor 100 act as slaves to the USB processor.

In operation, printer processor 100 will control all of the various functions of a printer, including printing, paper advance, start, stop, pause, jam detection, low or no paper detection, low ink detection, user interface indicators, etc. From time to time, it may be desired to change or add to this functionality by loading new printer firmware. The loading of new firmware is facilitated in accordance with the present invention by allowing a technician (or remote device) to connect to the USB port of USB processor 104 in order to provide the new firmware, which is then converted to serial data in a format that can be communicated to the printer processor over existing data paths (e.g., a ribbon cable). By providing two processors 100 and 104 with a shared memory 36, it is possible to use the existing $I^2C$ port of the printer processor to receive the command that directs the system to start sending converted USB data instead of the Netplex data to the printer processor serial port. In this manner, the USB signal effectively tells the system to switch to a mode where the USB data (converted into RS-232 serial data) is communicated to the printer processor. It is noted that although the invention is described in the context of Netplex and USB input data streams, virtually any other type of data streams currently known or developed in the future can be substituted therefor without departing from the teachings of the invention. Moreover, while the illustrated embodiment shows the use of the invention in connection with a printer, other computer peripherals that rely on firmware (which can be updated in accordance with the invention) can be supported as well.

Figure 7:
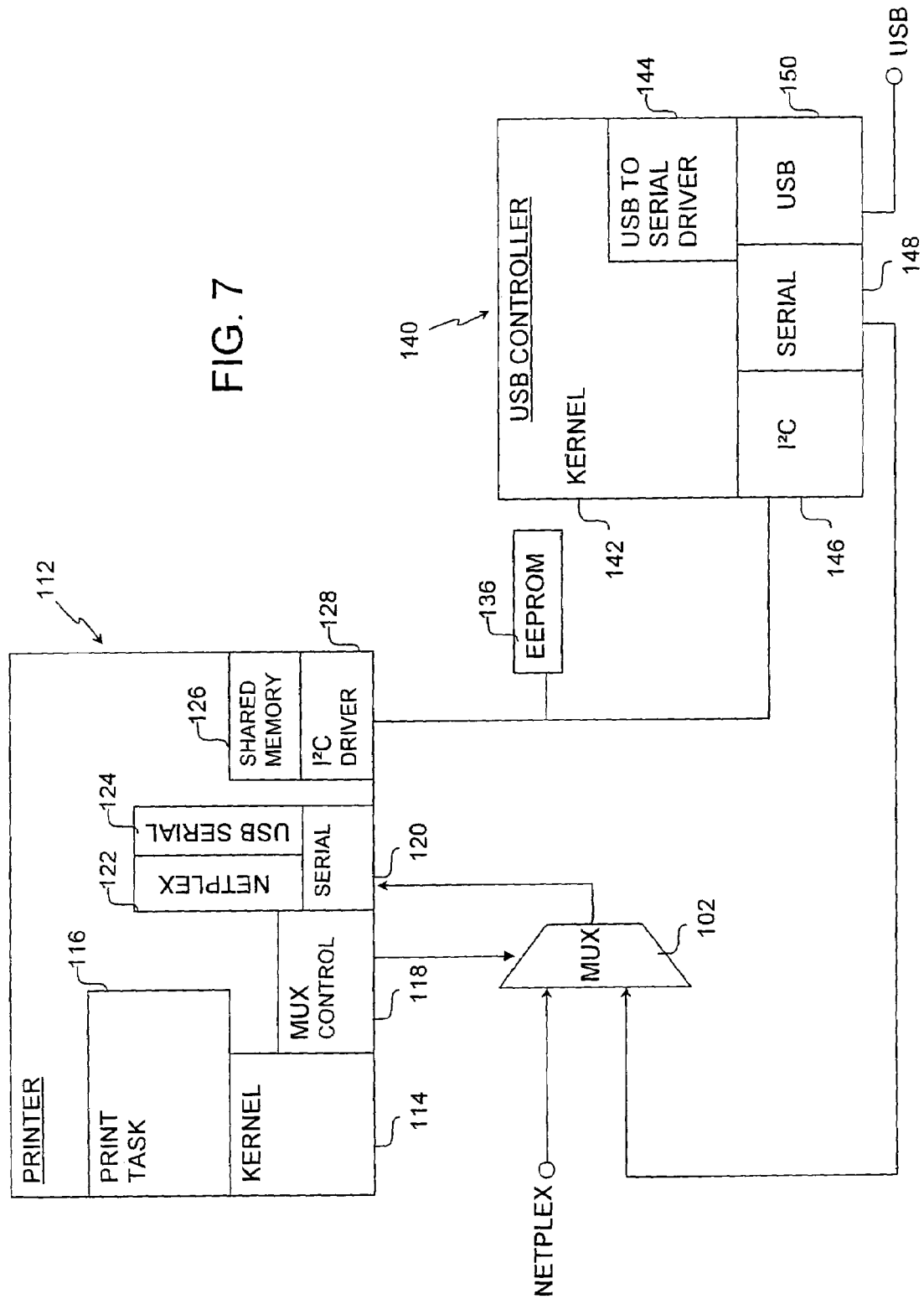
FIG. 7 is a software block diagram of an example implementation in accordance with the present invention.

FIG. 7 is a software block diagram illustrating the software components of one possible implementation of the present invention. This diagram is not meant to limit the scope of the disclosure, as many other implementations will be apparent to those skilled in the art without departing from the teachings of the invention.

The software implementation illustrated in FIG. 7 includes a printer module 112 and a USB controller module 140. The printer module 112 is run in the printer processor 100 of FIG. 6. The USB controller module 140 is run in the USB Processor 104 of FIG. 6. Printer module 112 includes a kernel 114 and print task functional code 116. Also included is the MUX control code 118, serial port code 120, Netplex and converted USB serial data drivers 122, 124, respectively, the shared memory driver 126 and an I$^2$C driver 128. The MUX control code 118 provides the MUX control signal that switches multiplexer 102 to output either the Netplex formatted data or the converted serial USB data to the serial port of the printer processor 100.

The USB controller module 140 includes a Kernel 142, a USB to serial driver 144, an I$^2$C driver 146, serial driver 148 and USB driver 150. The USB to serial driver 144 is responsible for converting the USB data stream input to USB driver 150 into serial data (e.g., RS-232) that can be communicated via serial driver 148 to the printer processor serial driver 120 via MUX 102. As noted above, by converting the USB data stream into a conventional serial data stream, such as RS-232, the need for special USB cables in the signal path is avoided. The I$^2$C driver 146 provides the command signal retrieved from the USB data stream to the shared memory (EEPROM) 136, which in turn provides the command signal to the printer processor via the I$^2$C port. As previously set forth, the command signal is used to switch MUX 102 from the Netplex mode to the serial USB mode, and vice-versa.

Figure 8:
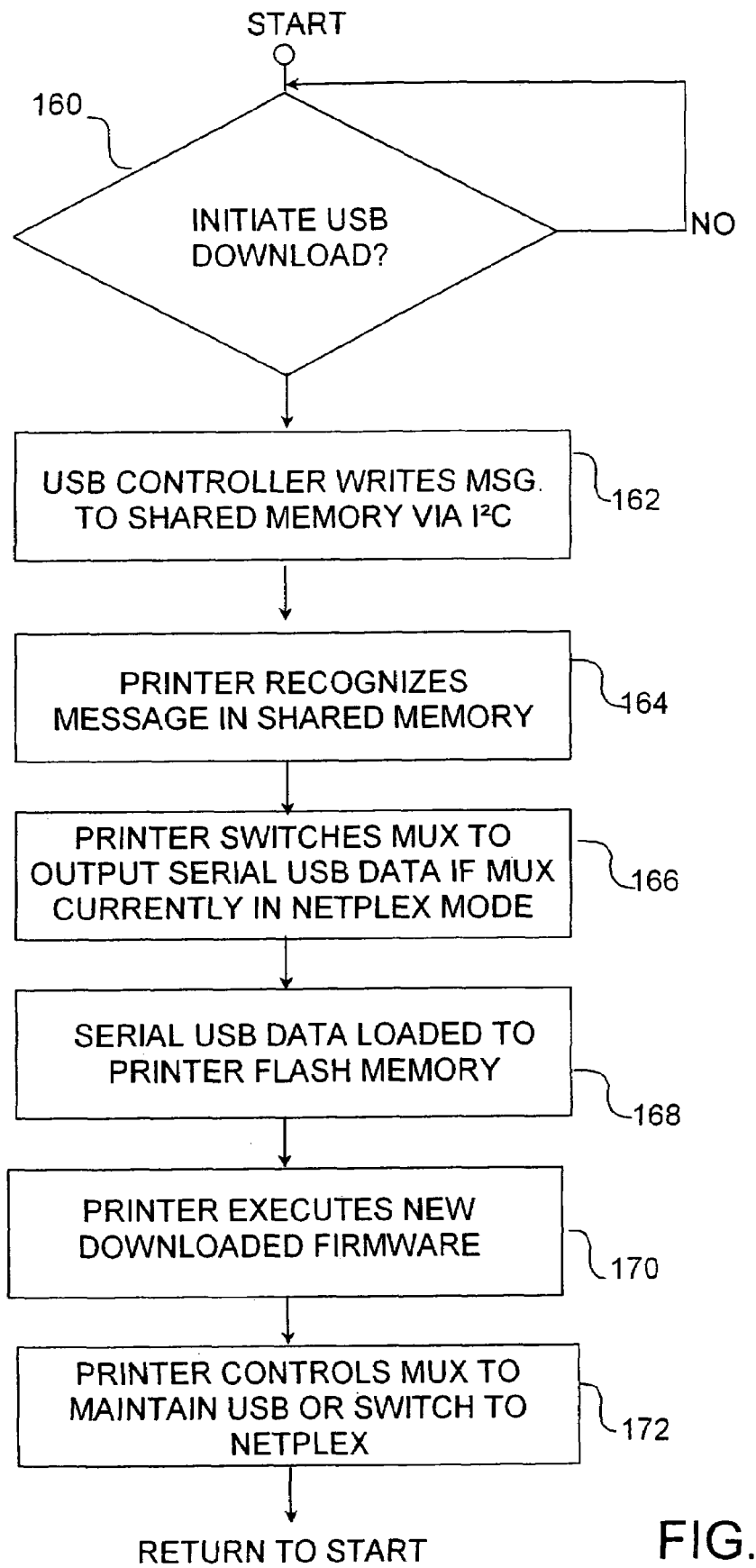
FIG. 8 is a flowchart illustrating the downloading of new firmware to a peripheral in accordance with the present invention.

FIG. 8 is a flowchart showing how a download of new firmware can be accomplished via the USB port. After the routine starts, a determination is made at box 160 as to whether a USB download is to be initiated. If not, the routine simply continues to loop back until a download is to be initiated. Once a download is initiated, the USB controller writes the command message to the shared memory (EEPROM 36) via the I$^2$C data path, as shown at box 162. The printer then recognizes the command message in the shared memory (box 164). In response to the command message, the printer generates the necessary MUX control signal to switch the MUX 102 to output the converted serial USB data if the MUX is currently in the Netplex mode (box 166). The printer processor then receives the converted serial USB data (e.g., in RS-232 format) from the MUX, and loads the received data (e.g., updated firmware) into printer flash memory 31 (box 168). At box 170, the printer executes the updated firmware firmware. In response to the firmware instructions, the printer controls the MUX 102 to either continue providing converted USB serial data at its output, or to switch and provide the Netplex formatted data at the MUX output. The routine then returns to the starting point so that the system is ready to initiate another USB download if and when commanded to do so, e.g., by a technician hooking a notebook computer containing new firmware to the system USB port.

Hardware for implementing the present invention is readily available. For example, the printer processor 100 can comprise the MCF5249 Coldfire™ microprocessor available from Freescale Semiconductor, Inc. (www.freescale.com). This microprocessor includes both I$^2$C and serial data ports. The USB processor 104 can comprise the CY7C68013A EZ-USB™ microcontroller available from Cypress Semiconductor Corporation (www.cypress.com).

It should now be appreciated that the present invention provides an interface with at least two ports for supplying data to a printer or other peripheral. The interface can be used, inter alia, for controlling a printer or other peripheral and updating the firmware or software therein. The peripheral (e.g., printer) can reside, for example, in a gaming machine, POS terminal, or in any other such device. In an illustrated embodiment, a first port receives data in a first format according to a corresponding protocol, such as Netplex or RS-232. A second port receives data in a second format according to another protocol, such as USB. Separate printer and USB processors are provided. In the illustrated embodiment, the USB processor is the master processor, and the printer processor is the slave. A shared memory is provided, so that a command from the USB processor can be given to the printer processor over a port, such as in I$^2$C port, separate from the port on which serial data is provided. Since USB data cannot usually be provided over the data paths (e.g., ribbon cable) provided in existing systems, the USB processor converts received USB data into RS-232 serial data or the like. A multiplexer is indirectly controlled by a command in the USB data. In particular, the command is provided from the USB processor, via the shared memory, to the separate port of the printer processor. The printer processor then generates a MUX control signal for switching the MUX to provide the converted serial USB data to the printer processor serial port instead of providing, for example, the Netplex formatted data to the printer processor serial port.

Although the invention has been described in connection with various specific embodiments, it should be appreciated that numerous adaptations and modifications may be made thereto without departing from the intended scope of the invention as set forth in the claims.

What is claimed is:

1. A method for driving a peripheral, comprising:
   receiving peripheral commands in a first protocol at a first port;
   receiving peripheral firmware and commands in a second protocol at a second port;
   directing data to the peripheral from said first port or from said second port in response to a command received at said second port;
   providing a first processor associated with said peripheral, said first processor having a serial data input and a first I$^2$C port;
   providing a second processor associated with said second port, said second processor having a USB data input for receiving USB data from said second port and a second I$^2$C port for communicating with a shared memory for the first and second processors;
   storing said command received at said second port in said shared memory via said second I$^2$C port;
   receiving said command at said first processor from said shared memory via said first I$^2$C data port, for processing by said first processor; and
   converting USB data received at second processor into serial formatted data;
   wherein:
      said step of directing data comprises coupling either (i) data from said first port or (ii) serial formatted data converted from USB data received at said second port to the serial data input of said first processor in response to said command; and
      said command is derived from USB data received by said second processor.

2. A method in accordance with claim 1, wherein said peripheral is a printer.

3. A method in accordance with claim 2, wherein:
   said first port receives data in one of an RS-232 or Netplex protocol; and said second port receives data in a USB protocol.

4. A method in accordance with claim 2, wherein said printer is a gaming machine printer.

5. A method in accordance with claim 2, wherein said printer is a point of sale terminal printer.

6. A method in accordance with claim 1, comprising:
configuring said first processor to accept data in the protocol received at said first port, or to accept data in the serial RS-232 format provided by said second processor, depending on said command.

7. Apparatus for controlling a peripheral to receive data from different data ports, comprising:
a first port for receiving data formatted according to a first protocol;
a second port for receiving data formatted according to a second protocol, said second protocol comprising a USB protocol;
a first processor associated with said peripheral and having a serial data input and a first $I^2C$ port;
a second processor associated with said second port and having a second $I^2C$ port;
a switch adapted to receive:
(i) first data from the first port; and
(ii) second data from said second port after processing by said second processor;
said switch being controlled in response to a command received via said second port to couple either said first data or second data to the serial data input of said first processor for use in controlling said peripheral; and
a shared memory for said first and second processors for storing said command;
wherein:
said command is communicated from said second processor to said shared memory via said second $I^2C$ port and from the shared memory to the first processor via said first $I^2C$ port; and
said second processor provides said second data by converting the USB protocol data from the second port into serial formatted data.

8. Apparatus in accordance with claim 7, wherein said first port receives data in a Netplex protocol.

9. Apparatus in accordance with claim 7, wherein said printer is a gaming machine printer.

10. Apparatus in accordance with claim 7, wherein said printer is a point of sale terminal printer.

* * * * *

UNITED STATES PATENT AND TRADEMARK OFFICE
CERTIFICATE OF CORRECTION

| | | |
|---|---|---|
| PATENT NO. | : 7,529,868 B2 | Page 1 of 1 |
| APPLICATION NO. | : 11/365751 | |
| DATED | : May 5, 2009 | |
| INVENTOR(S) | : Brooks et al. | |

It is certified that error appears in the above-identified patent and that said Letters Patent is hereby corrected as shown below:

(1) Column 10, line 51: "shared memory via said first $I^2C$ data port, for process-" should read
-- shared memory via said first $I^2C$ port, for process- --

(2) Column 11, line 9: "serial RS-232 format provided by said second processor," should read
-- serial format provided by said second processor, --

(3) Column 12, line 20: "printer is a gaming machine printer." should read
-- peripheral is a gaming machine printer. --

(4) Column 12, line 22: "printer is a point of sale terminal printer." should read
-- peripheral is a point of sale terminal printer. --

Signed and Sealed this
Seventeenth Day of July, 2012

David J. Kappos
*Director of the United States Patent and Trademark Office*